US012743364B2

(12) United States Patent
Guan et al.

(10) Patent No.: US 12,743,364 B2
(45) Date of Patent: Sep. 22, 2026

(54) WORKFLOW IMPACT ANALYSIS

(71) Applicant: International Business Machines Corporation, Armonk, NY (US)

(72) Inventors: Zhi Li Guan, Beijing (CN); Peng Hui Jiang, Beijing (CN); Jun Su, Beijing (CN); Kun Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 18/428,001

(22) Filed: Jan. 31, 2024

(65) Prior Publication Data

US 2025/0245133 A1 Jul. 31, 2025

(51) Int. Cl.

| | |
|---|---|
| ***G06F 9/44*** | (2018.01) |
| ***G06F 8/41*** | (2018.01) |
| ***G06F 8/71*** | (2018.01) |
| ***G06F 11/362*** | (2025.01) |
| ***G06F 11/3668*** | (2025.01) |
| ***G06F 21/53*** | (2013.01) |

(52) U.S. Cl.

CPC .......... *G06F 11/3688* (2013.01); *G06F 8/433* (2013.01); *G06F 8/71* (2013.01); *G06F 11/3636* (2013.01); *G06F 11/3676* (2013.01); *G06F 21/53* (2013.01)

(58) Field of Classification Search

CPC ......... G06F 11/3688; G06F 8/433; G06F 8/71

See application file for complete search history.

(56) References Cited

U.S. PATENT DOCUMENTS

| | | | | |
|---|---|---|---|---|
| 9,367,434 | B2 | 6/2016 | Taneja et al. | |
| 10,289,524 | B2 | 5/2019 | Kaulgud et al. | |
| 10,832,199 | B2 | 11/2020 | Chirica et al. | |
| 2005/0223361 | A1* | 10/2005 | Belbute | G06F 11/3688 717/124 |
| 2007/0234293 | A1* | 10/2007 | Noller | G06F 11/3688 717/124 |
| 2013/0097706 | A1* | 4/2013 | Titonis | G06F 21/566 726/22 |
| 2014/0165043 | A1* | 6/2014 | Pasala | G06F 11/3684 717/124 |
| 2017/0075795 | A1* | 3/2017 | Sinha | G06F 11/3684 |
| 2017/0300701 | A1* | 10/2017 | Ponta | G06Q 10/06 |
| 2018/0113100 | A1 | 4/2018 | St-Laurent et al. | |
| 2018/0365133 | A1* | 12/2018 | Mitchell | G06F 8/71 |
| 2020/0057631 | A1* | 2/2020 | Taniguchi | G06F 8/20 |
| 2022/0207438 | A1 | 6/2022 | Johnston et al. | |
| 2023/0068689 | A1* | 3/2023 | Dutta | G06F 11/3676 |
| 2023/0251960 | A1 | 8/2023 | Sharma et al. | |
| 2024/0095149 | A1* | 3/2024 | Hegadi | G06F 11/3688 |

* cited by examiner

*Primary Examiner* — Hang Pan

(74) *Attorney, Agent, or Firm* — Joseph P. Curcuru

(57) ABSTRACT

An embodiment monitors a code repository for changes made to source code. The embodiment detects a change made to the source code, and upon detecting the change made to the source code, identifies a potentially impacted workflow node of a workflow based on the change made to the source code. The embodiment identifies an execution tree of the workflow that contains the potentially impacted workflow node. The embodiment identifies a set of test cases corresponding to the execution tree. The embodiment generates a test case recommendation based on the set of test cases identified. The embodiment transmits the test case recommendation to a user device.

13 Claims, 12 Drawing Sheets

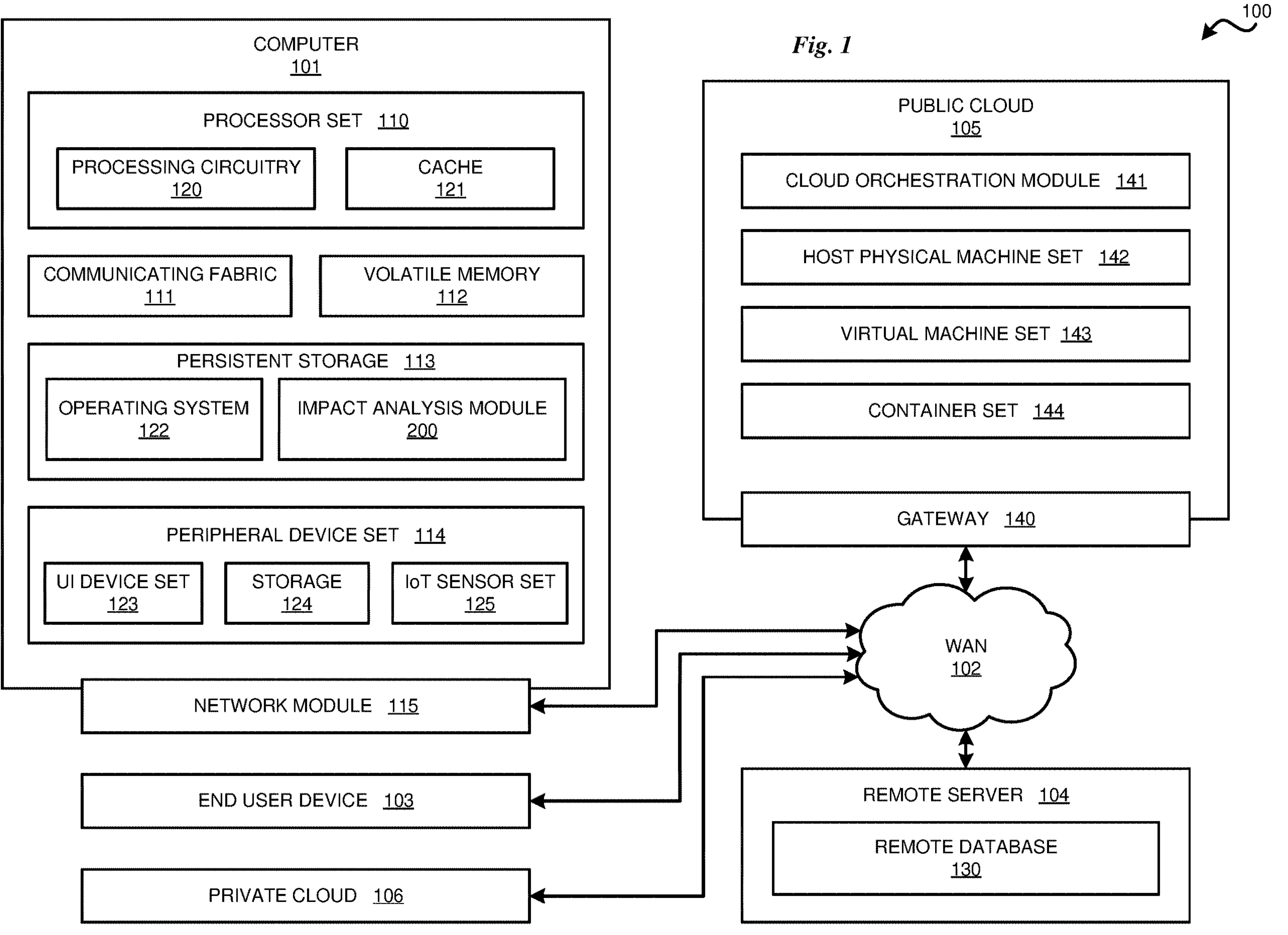
100
Fig. 1
COMPUTER 101
PROCESSOR SET 110
PROCESSING CIRCUITRY 120
CACHE 121
COMMUNICATING FABRIC 111
VOLATILE MEMORY 112
PERSISTENT STORAGE 113
OPERATING SYSTEM 122
IMPACT ANALYSIS MODULE 200
PERIPHERAL DEVICE SET 114
UI DEVICE SET 123
STORAGE 124
IoT SENSOR SET 125
NETWORK MODULE 115
END USER DEVICE 103
PRIVATE CLOUD 106
PUBLIC CLOUD 105
CLOUD ORCHESTRATION MODULE 141
HOST PHYSICAL MACHINE SET 142
VIRTUAL MACHINE SET 143
CONTAINER SET 144
GATEWAY 140
WAN 102
REMOTE SERVER 104
REMOTE DATABASE 130

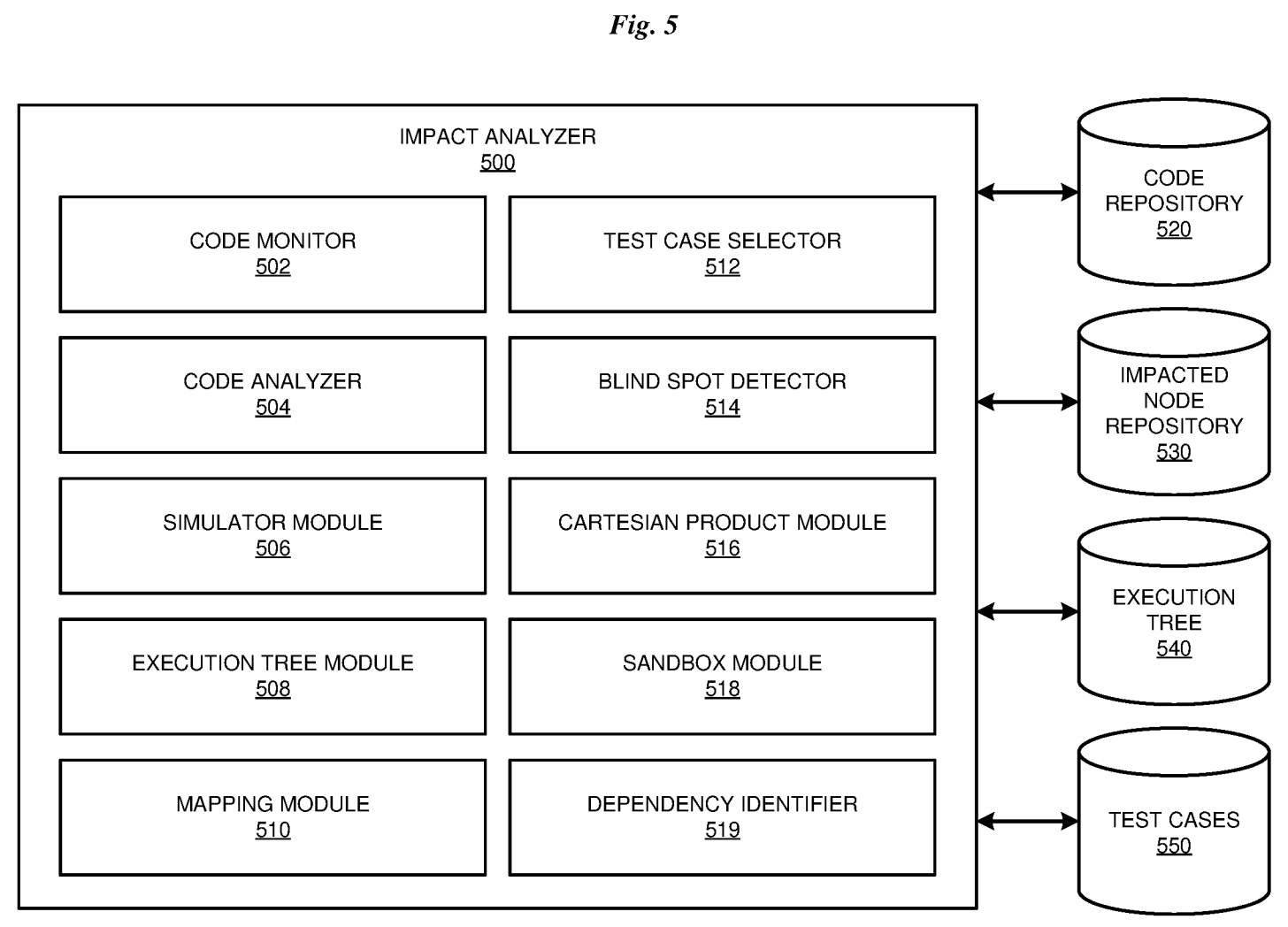

CODE REPOSITORY 520

IMPACTED NODE REPOSITORY 530

EXECUTION TREE 540

TEST CASES 550

IMPACT ANALYZER 500

CODE MONITOR 502

TEST CASE SELECTOR 512

CODE ANALYZER 504

BLIND SPOT DETECTOR 514

SIMULATOR MODULE 506

CARTESIAN PRODUCT MODULE 516

EXECUTION TREE MODULE 508

SANDBOX MODULE 518

MAPPING MODULE 510

DEPENDENCY IDENTIFIER 519

*Fig. 5*

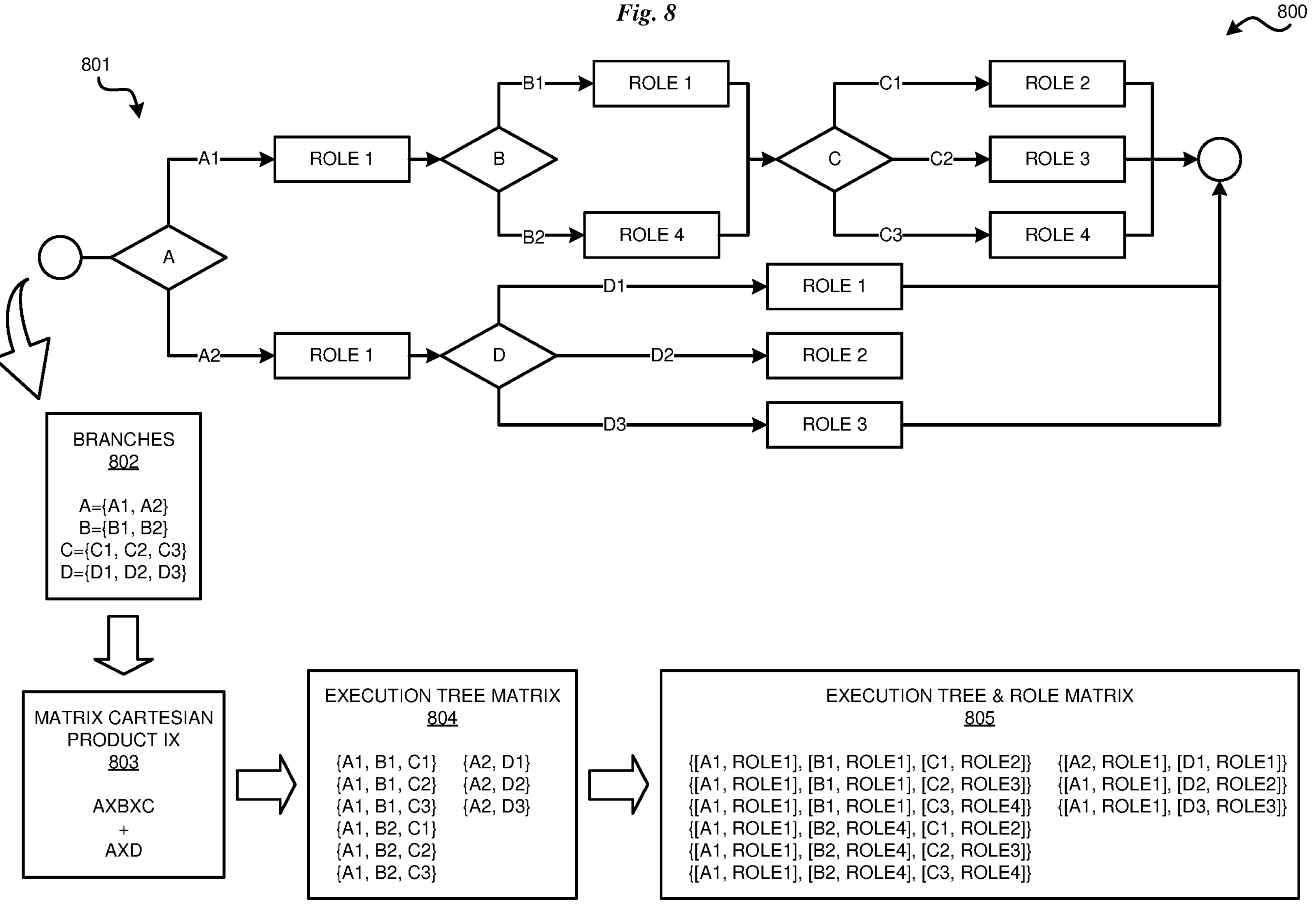
Fig. 8
800
801
A
A1
A2
ROLE 1
ROLE 1
B
B1
B2
ROLE 1
ROLE 4
C
C1
C2
C3
ROLE 2
ROLE 3
ROLE 4
D
D1
D2
D3
ROLE 1
ROLE 2
ROLE 3
BRANCHES
802
A={A1, A2}
B={B1, B2}
C={C1, C2, C3}
D={D1, D2, D3}
MATRIX CARTESIAN PRODUCT IX
803
AXBXC
+
AXD
EXECUTION TREE MATRIX
804
{A1, B1, C1} {A2, D1}
{A1, B1, C2} {A2, D2}
{A1, B1, C3} {A2, D3}
{A1, B2, C1}
{A1, B2, C2}
{A1, B2, C3}
EXECUTION TREE & ROLE MATRIX
805
{[A1, ROLE1], [B1, ROLE1], [C1, ROLE2]} {[A2, ROLE1], [D1, ROLE1]}
{[A1, ROLE1], [B1, ROLE1], [C2, ROLE3]} {[A1, ROLE1], [D2, ROLE2]}
{[A1, ROLE1], [B1, ROLE1], [C3, ROLE4]} {[A1, ROLE1], [D3, ROLE3]}
{[A1, ROLE1], [B2, ROLE4], [C1, ROLE2]}
{[A1, ROLE1], [B2, ROLE4], [C2, ROLE3]}
{[A1, ROLE1], [B2, ROLE4], [C3, ROLE4]}

1000
IDENTIFY WORKFLOW DEPENDENCIES
1002
CREATE A SANDBOX ENVIRONMENT
1004
EMULATE WORKFLOW ACTIONS
1006
APPLY ACCESS CONTROL LISTS
1008
MONITOR AND CAPTURE EXECUTION DATA
1010
CONSTRUCT EXECUTION TREE
1012

WORKFLOW IMPACT ANALYSIS

BACKGROUND

The present invention relates generally to software testing. More particularly, the present invention relates to a method, system, and computer program for optimizing workflow testing through automated impact analysis.

Software testing is an important step in the development of a software application. Accordingly, software testing is performed as a part of the development of virtually every software application in existence today, and provides several benefits to the development of a software application. One aspect of software testing includes detection and identification of bugs, errors, defects, and unexpected outcomes resulting from the execution of a software application. Another aspect of software testing may include identifying vulnerabilities and weaknesses in the software that could be exploited by malicious actors. Another aspect of software testing may include assessing how well the software performs under various conditions, by performing, for example load testing and stress testing, to identify bottlenecks, performance issues, and/or scalability concerns. Yet another aspect of software testing may include identifying and fixing usability issues, ensuring that the software is user-friendly and provides a seamless interaction for end-users. Accordingly, by identifying and addressing such potential defects described and more, software testing helps prevent unexpected behavior, and other issues that could compromise the reliability of a software application.

Impact analysis is a type of software testing that includes the process of evaluating and understanding the potential effects of changes made to a software application. Accordingly, a change made to the source code of a software application may have an impact on one or more components of a software application, some of which may be unexpected by a developer implementing such change. Impact analysis is important for assessing how modifications in one part of the software can impact other related components or functionalities. The goal of impact analysis is to identify and mitigate any potential risks or issues that may arise as a result of any potential changes. Currently, various methodologies and architectures are in existence for the performance of impact analysis based software testing. However, identifying components of a software application that may be affected by changes made to source code remains a computationally inefficient, and oftentimes computationally expensive task to complete, although it is necessary to ensure thorough testing of a software application.

SUMMARY

The illustrative embodiments provide for automated impact analysis. An embodiment includes monitoring a code repository for changes made to source code. The embodiment also includes detects a change made to the source code, and upon detecting the change made to the source code, identifying a potentially impacted workflow node of a workflow based on the change made to the source code. The embodiment also includes identifying an execution tree of the workflow that contains the potentially impacted workflow node. The embodiment also includes identifying a set of test cases corresponding to the execution tree. The embodiment also includes generating a test case recommendation based on the set of test cases identified. The embodiment also includes transmitting the test case recommendation to a user device. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 1 depicts a block diagram of a computing environment in accordance with an illustrative embodiment;

FIG. 5 depicts a block diagram of an example impact analysis module in accordance with an illustrative embodiment;

FIG. 8 depicts a block diagram of an example process for constructing a cartesian product representation in accordance with an illustrative embodiment;

DETAILED DESCRIPTION

Figure 2:
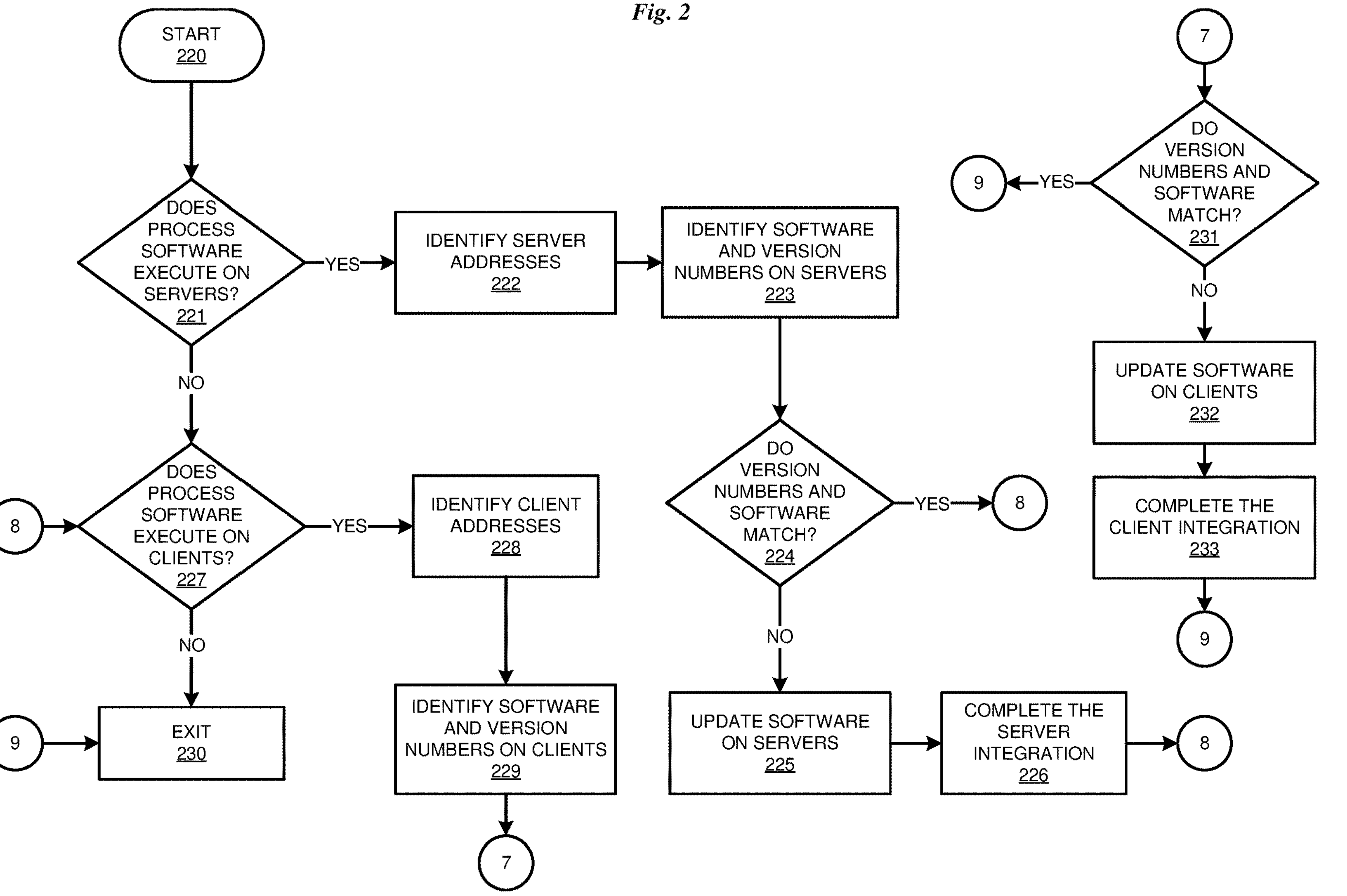
FIG. 2 depicts a block diagram of an example system and method for integration in accordance with an illustrative embodiment.

Workflow applications are commonly employed to improve productivity across various industries. A workflow may typically involve several roles and system tasks to execute to accomplish a specific job. Further, a workflow may be designed as a tree structure that comprises multiple branches, such that each branch may represent a particular condition necessary for the execution of a task. A full test of a particular workflow may entail testing each branch of the tree structure.

Although workflows may be utilized to improve productivity, there are several problems that reside in currently existing workflow applications. One problem related to workflow applications may be that a workflow test is not efficient, due to the many branches and associated matrix corresponding to the workflow. Another problem related to existing applications may be that a workflow test is not comprehensive, in that not all potential impacts are anticipated and evaluated. Another problem related to existing applications is that it may be difficult to identify a node and/or branch that corresponds to a particular test, so it may not be easy to identify which test should be triggered according to which node and/or branch in a workflow may be impacted. Yet another problem of currently existing workflow applications includes a difficulty in identifying a performance bottleneck of a workflow that may prevent achievement of increased efficiency.

Current practices related to workflow testing do not provide optimized workflow testing at least because current practices do not consider various aspects considered herein. For example, current practices related to workflow testing do not consider executing particular test cases or sets of test cases that cover specifically impacted nodes and/or branches of a workflow.

Further, current practices related to workflow testing do not consider simulating the execution of a workflow in a virtual sandbox environment, incorporating different roles to ensure realistic workflow execution scenarios. Further, current practices related to workflow testing do not consider extracting test cases, roles and a corresponding execution tree set that collectively represents the workflow roles and actions each role can execute, based on the execution data obtained resultant from simulating the execution of the workflow in the virtual sandbox environment.

Further, current practices related to workflow testing do not consider creating a cartesian product set of execution trees for each workflow that captures various possible execution paths and scenarios. Accordingly, the cartesian product set of execution trees may be utilized for various purposes, such as for example, to filter an invalid execution tree, find a potential test blind point in the workflow, and build a full knowledgebase for execution trees.

Further, current practices related to workflow testing do not consider establishing a mapping that defines relationships between test cases, roles and execution trees to determine which test data with which role permission can cover specific parts of the workflow.

Further, current practices related to workflow testing do not consider monitoring code changes in the workflow to identify when update or other change to the code occurs. Further, current practices related to workflow testing do not consider analyzing the code implementation of a workflow to identify potential impacted nodes and/or branches within the workflow. Further, current practices related to workflow testing do not consider intelligently selecting test cases that can cover the impacted workflow nodes upon detection of a change made to source code to ensure comprehensive and efficient test coverage of the entire workflow.

Currently there is no way to simulate impact of a modification to a component of the workflow, identify a localized target for impact of a workflow, determine potentially affected branches of a workflow based on an action, and execute specific test cases based on potentially affected branches of the workflow. Also, there is currently no existing way to detect blind spots in software testing with respect to particular branches of a workflow. These current limitations make it impossible to provide reliable, comprehensive, and computationally efficient, workflow analysis. As a result, current efforts in this regard are inefficient and ineffective at least in part due to the current inability to identify potentially affected branches of a workflow, execute branch specific tests, and discover blind spots (e.g., missing tests) in a workflow application.

The present disclosure addresses the deficiencies described above by providing a process (as well as a system, method, machine-readable medium, etc.) that optimizes workflow testing through automated impact analysis. Disclosed embodiments include simulating a workflow in a virtual sandbox environment to obtain execution data that may be utilized in part to construct a knowledge base defining relationships between execution trees and test cases corresponding to particular branches and/or nodes of execution trees.

The illustrative embodiments provide for automated workflow impact analysis. A workflow as referred to herein refers to an orchestrated pattern of activity, which is enabled by a systematic organization of roles, permissions, actions, and resources, into processes that are executed along specific execution paths to accomplish a certain task and/or process information related to a specific task. Embodiments disclosed herein describe the workflow in reference to software applications; however, use of this example is not intended to be limiting, but is instead used for descriptive purposes only. Instead, the workflow may include elements of any industry, including but not limited to, manufacturing, supply-chain logistics, transportation, research and development, as well as many other applications. Accordingly, aspects of the present disclosure may be applied to a workflow covering any type of process comprising any number of roles, components, and functionalities.

As used throughout the present disclosure, the term "execution tree" refers to a data structure that comprises a hierarchical and graphical representation that defines various paths and sequences of executions that a program or system may follow during operation. An execution tree structure organizes the different roles, processes, functions, or operations within a program, defining the overall flow of control and the possible decision points. An execution tree may comprises a plurality of nodes, and a plurality of branches connecting pairs of nodes of the execution tree, to form various execution paths.

Each node in the execution tree may represent a specific operation or task, while the branches between nodes represent alternative paths of the workflow that can taken based on design parameters, dependencies, permissions, conditional statements, loops, or other control flow constructs. As the workflow executes, the execution tree is traversed along different branches according to the conditions encountered, and ultimately completes execution upon arrival at one or more outcomes of a set of possible outcomes, based on the conditions encountered during traversal of the execution tree.

As used throughout the present disclosure, the term "access control list" (or simply "ACL") refers to a list of permissions associated with a system resource. An ACL may specify which users or system processes are granted access to resources, as well as what operations are allowed on given resources. Each entry in a typical ACL specifies a subject and an operation. Each system resource may have a security attribute that identifies its ACL. The ACL may include an entry for every user and/or component that can access the system. ACLs may be used for controlling permissions to a computer system or computer network, and to filter traffic in and out of a specific device. For a given workflow, certain users and/or components may have different levels of privilege, depending on their role. For example, a user logged in as network administrator may have read, write and edit permissions for a sensitive file or other resource. By contrast, a user logged in as a guest may only have read permissions.

As used throughout the present disclosure, the term "blind spot" refers to a component of a workflow that may be insufficiently tested or overlooked during testing of the workflow. Accordingly, it may be possible that a workflow may contain certain nodes and/or branches that are not covered by any existing test cases, or that are insufficiently covered by existing test cases.

Illustrative embodiments include establishing a knowledge base based at least in part on data received from various data sources of a workflow. In some embodiments, the data sources may include data such as execution data, role data, permission data, and/or test case data. In an embodiment, the knowledge base comprises data representative of relationships between roles, tasks, and test cases for the workflow. In an embodiment, the knowledge base includes a mapping that defines relationships between nodes and/or branches of an execution tree representative of a workflow and test cases corresponding to different nodes and/or branches of the execution tree. Illustrative embodiments include establishing a mapping defining a plurality of relationships between test cases, roles, and execution trees to determine which test data with which role permission can cover specific parts of the workflow.

Illustrative embodiments include simulating execution of a workflow to obtain simulation results. In an embodiment, the process includes simulating execution of a workflow in a sandbox virtual environment. In an embodiment, simulating execution of a workflow in a sandbox environment includes applying different ACLs during simulation over a number of simulation iterations. Illustrative embodiments further include extracting one or more execution trees representative of the simulation results obtained from executing a number of simulations of the workflow.

Illustrative embodiment includes constructing a cartesian product set of execution trees for a workflow. In an embodiment, the cartesian product represents all various possible execution paths and scenarios of the workflow. Illustrative embodiments include identifying one or more testing blind spots. In an embodiment, identifying one or more blind spots may includes identifying nodes and/or branches of one or more execution trees that do not correspond to any test cases or an insufficient number few test cases.

Illustrative embodiments include monitoring code changes in the workflow to detect when a change or updated update occurs. Illustrative embodiments include analyzing the change or update detected to determine which components of a workflow may be affected by the change or update. Illustrative embodiments include selecting one or more test cases to execute to evaluate a potential impact on the workflow. In an embodiment, the one or more test cases are selected upon detecting a change, and analyzing the change to the source code to identify a potentially impacted node and/or branch of the workflow resultant from the change detected. In some embodiments, a set of test cases corresponding to particular nodes and/or branches is recommended for execution. In some other embodiments, a set of test cases is automatically executed to determine what effect a change to source code may have on a particular workflow.

In an embodiment, the detected change is removed upon a determination of a failure of test case of the set of test cases. In an embodiment, the detected change is integrated upon a determination of a success of the test cases.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as impact analysis module 200 that is configured to monitor and detect changes to a software application and provide recommendations to execute software tests based on changes detected. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

With reference to FIG. 2, this figure depicts of a flowchart of an example process software integration in accordance with an illustrative embodiment. In an embodiment, the process software including impact analysis process software may be integrated into a client, server and network environment, by providing for the process software to coexist with applications, operating systems and network operating systems software and then installing the process software on the clients and servers in the environment where the process software will function.

The integration process identifies any software on the clients and servers, including the network operating system where the process software will be deployed, that are required by the process software or that work in conjunction with the process software. This includes software in the network operating system that enhances a basic operating system by adding networking features. The software applications and version numbers will be identified and compared to the list of software applications and version numbers that have been tested to work with the process software. Those software applications that are missing or that do not match the correct version will be updated with those having the correct version numbers. Program instructions that pass parameters from the process software to the software applications will be checked to ensure the parameter lists match the parameter lists required by the process software. Conversely, parameters passed by the software applications to the process software will be checked to ensure the parameters match the parameters required by the process software. The client and server operating systems, including the network operating systems, will be identified and compared to the list of operating systems, version numbers and network software that have been tested to work with the process software. Those operating systems, version numbers and network software that do not match the list of tested operating systems and version numbers will be updated on the clients and servers in order to reach the required level.

After ensuring that the software, where the process software is to be deployed, is at the correct version level that has been tested to work with the process software, the integration is completed by installing the process software on the clients and servers.

Step 220 begins the integration of the process software. An initial step is to determine if there are any process software programs that will execute on a server or servers (221). If this is not the case, then integration proceeds to 227. If this is the case, then the server addresses are identified (222). The servers are checked to see if they contain software that includes the operating system (OS), applications, and network operating systems (NOS), together with their version numbers that have been tested with the process software (223). The servers are also checked to determine if there is any missing software that is required by the process software (223).

A determination is made if the version numbers match the version numbers of OS, applications, and NOS that have been tested with the process software (224). If all of the versions match and there is no missing required software, the integration continues (227).

If one or more of the version numbers do not match, then the unmatched versions are updated on the server or servers with the correct versions (225). Additionally, if there is missing required software, then it is updated on the server or servers (225). The server integration is completed by installing the process software (226).

Step 227 (which follows 221, 224 or 226) determines if there are any programs of the process software that will execute on the clients. If no process software programs execute on the clients, the integration proceeds to 230 and exits. If this not the case, then the client addresses are identified (228).

The clients are checked to see if they contain software that includes the operating system (OS), applications, and network operating systems (NOS), together with their version numbers that have been tested with the process software (229). The clients are also checked to determine if there is any missing software that is required by the process software (229).

A determination is made if the version numbers match the version numbers of OS, applications, and NOS that have been tested with the process software (231). If all of the versions match and there is no missing required software, then the integration proceeds to 230 and exits.

If one or more of the version numbers do not match, then the unmatched versions are updated on the clients with the correct versions 232. In addition, if there is missing required software, then it is updated on the clients 232. The client integration is completed by installing the process software on the clients 233. The integration proceeds to 230 and exits.

Figure 3:
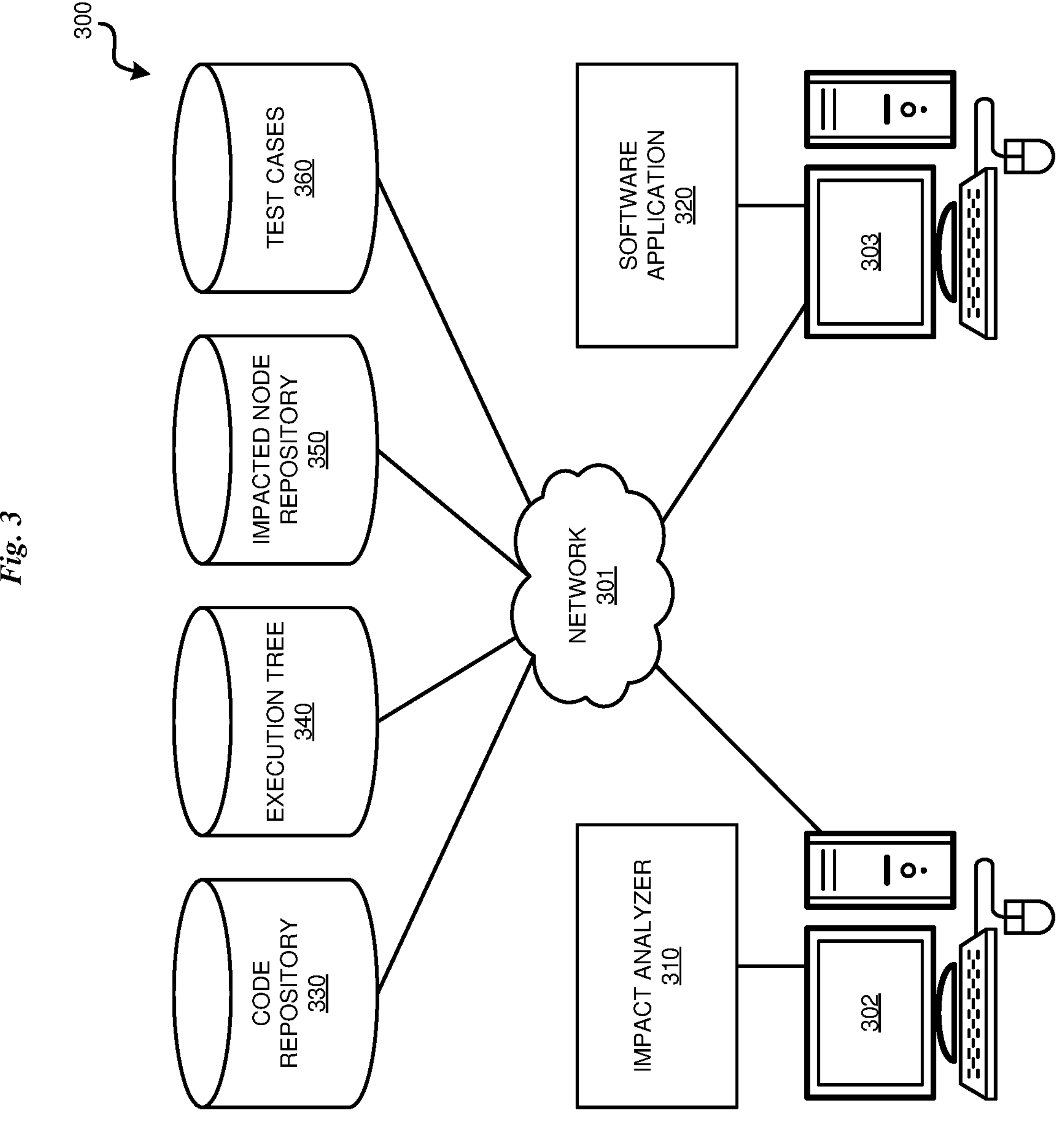
FIG. 3 depicts a block diagram of an example computing environment of a impact analysis module in accordance with an illustrative embodiment.

With reference to FIG. 3, this figure depicts a block diagram of an example computing environment 300 in accordance with an illustrative embodiment. In the illustrated embodiment, the impact analyzer module 310 includes impact analysis module 200 of FIG. 1.

In the illustrated embodiment, the computing environment 300 includes an administrator device 302 deploying the impact analyzer module 310. In the illustrated embodiment, network 301 comprises any suitable network configured to transmit information between at least the depicted components of computing environment 300.

In the illustrated embodiment, the impact analyzer module 310 is configured to perform operations to analyze a potential impact that a change to source code of a software application 320 may cause. Accordingly, a developer utilizing developer device 303 may implement some changes to the source code of the software application 320. Any change to the source code of the software application may be stored on the code repository 330. An administrator or other authorized user may initiate impact analyzer module 310 via administrator device 302. Upon initialization of impact analyzer module 310, the impact analyzer monitors code repository 330 for any changes made to software application 320.

Further, upon detecting a change made to source code of software application 320 stored on code repository 330, impact analyzer module 310 may determine which nodes and/or branches of an execution tree corresponding to software application 320 may be potentially affected due to the change in source code that was detected. In an embodiment, impact analyzer module 310 constructs an execution tree of the software application 320, and stores the execution tree on execution tree repository 340. In an embodiment, the execution tree repository 340 stores a plurality of execution trees corresponding to software application 320, such that the plurality of execution trees stored on the execution tree repository 340 cover all possible execution paths of software application 320. Further, impact analyzer module 310 may be configured to isolate particular nodes and/or branches, and/or entire sub-trees that may be affected due to a detected change in source code, on impacted node repository 350.

As described herein, the impact analysis module 310 may provide an automated software testing recommendation system that manifests in the form of a of an Internet website, mobile application, user interrace (UI), or graphic user interface (GUI) that is accessible by any suitable computing device by any user having sufficient privileges. Further, administrator device 302 may include a backend administration system allows users with administrative privileges to perform various administrative tasks associated with the impact analysis module 310 as described herein, such as initiating source code monitoring and/or adjusting, adding, and/or removing test cases to be executed upon detection to a change made to source code.

In some embodiments, administrative device 310 connects with an API gateway via network 301, which may include any suitable network or combination of networks such as the Internet, etc. and uses any suitable communication protocols such as Wi-Fi, Bluetooth, etc. In some embodiments, computing system 300 may be built on the basis of cloud computing. Further, the API gateway may provide access to client applications like the impact analysis module 301. Further, the API gateway may receive service requests issued by client applications and create service lookup requests based on service requests. As a non-limiting example, in an embodiment, the administrator device 302 executes a routine to initiate interaction with the impact analysis module 310. For instance, in some embodiments, the administrator device 302 executes a routine to instruct the impact analysis module 310 to monitor source code repository 330 according to embodiments described herein.

In the illustrated embodiment, the impact analyzer module 310 receives monitored data from code repository 330 via a network 301 and determines whether any changes were made to the source code stored on code repository 330. The impact analyzer module 310 may compare source code stored on code repository 330 at a present moment in time to source code stored on code repository 330 at a previous moment in time to evaluate whether any changes have been made to source code. It is contemplated herein that impact analyzer module 310 may utilize any known techniques to detect whether any changes have taken place over source code repository 330. Embodiments of the code repository 330 include a repository for storing source code of a software application; however, the use of this example is not intended to be limiting, and instead, code repository 330 may include any information and/or details related to any components and/or functionalities of a software application that is monitored for changes. For example, it is contemplated that a change to a component or a function of a software application might not be directly apparent in source code, but nevertheless details of the change are stored in code repository 330 and detectable by impact analyzer module 310. In the illustrative embodiment, the software application data stored on code repository 330 is representative of one or more components and/or functionalities of the software application 320.

In an embodiment, the impact analyzer module 310 generates and transmits a recommendation to execute selected software tests stored on test cases repository 360. The recommendation may include, for example, an email message, text message, or other message or image data that conveys a recommendation to user of a computing device, such as administrative user of administrator device 302 or a user of developer device 303.

In the illustrated embodiment, an administrative user device 302 allows users with administrative privileges to perform various administrative tasks associated with the impact analyzer module 310 as described herein. For example, in some embodiments, the administrative user device 302 allows an administrative user to initiate a source code monitoring process. As another example, in some embodiments, the administrative user device 302 allows a user with administrative privileges to adjust parameters of test cases stored on test cases repository 360, as well as add and/or remove test cases from test cases repository 360.

In the illustrated embodiment, the impact analyzer module 310 is also in communication with network 301. Network 301 includes a plurality of network data sources, such as for example, code repository 330, execution tree repository 340, impacted node repository 350, and test cases repository 360. The exact technique to monitor changes made to application software 320 may be implementation-specific and dependent upon the types of components and/or functionalities of software application 320.

The impact analyzer module 320 is also in communication with developer device 303, as well as other computing devices (not shown), which may include any type of computing devices. In an example embodiment, the impact analyzer module 310 recommends test cases to execute to a user of developer device 303, so that the user is made aware of how the changes the developer has implemented may impact the components and/or functionalities of software application 320.

In some embodiments, the impact analyzer module 310 receives data from code repository 330, execution tree repository 340, and/or test cases repository 350 and uses said data to establish a knowledge base. In some embodiments, the knowledge base includes relationships between execution trees of a workflow (e.g., software application) and test cases corresponding to particular nodes and/or branches of those execution trees.

In the illustrated embodiment, code repository 330 is configured to store source code corresponding to software application 320. In an embodiment, impact analyzer 310 is configured to monitor code repository 330 for any changes made to source code stored on code repository 330, and upon detecting a change made to source code, perform impact analysis operations, as described in greater detail herein. In an embodiment, impact analyzer 310 may utilize any suitable program or combination of programs to monitor changes made to source code on source code repository 330.

In the illustrated embodiment, execution tree repository 340 is configured to store one or more execution trees representative of a workflow of software application 320. Each execution tree includes a plurality of nodes representative of actions of the workflow and includes a plurality of branches connecting pairs of nodes representative of execution paths between actions of the workflow. The actions of the workflow will depend on the type of application and may be implementation specific.

In the illustrated embodiment, impacted node repository 350 is configured to store nodes of an execution tree corresponding to software application 320 that may be affected by a change in source code that was detected by impact analyzer module 310. In an embodiment, impact analyzer 310 is configured to establish impacted node repository 350, and store and/or retrieve information from impacted node repository 350 via network 301.

In the illustrated embodiment, test cases repository 360 is configured to test cases code corresponding to software application 320. In an embodiment, impact analyzer 310 recommends and/or executes one or more test cases stored on test cases repository 360 upon detection of a change made to source code stored on code repository 330. In a particular embodiment, impact analyzer 310 recommends and/or executes only relevant test cases, wherein relevance of a test case based on a determination that a node and/or branch of an execution tree corresponding to software application 320 may be affected by a change made to source code that was detected.

Figure 4:
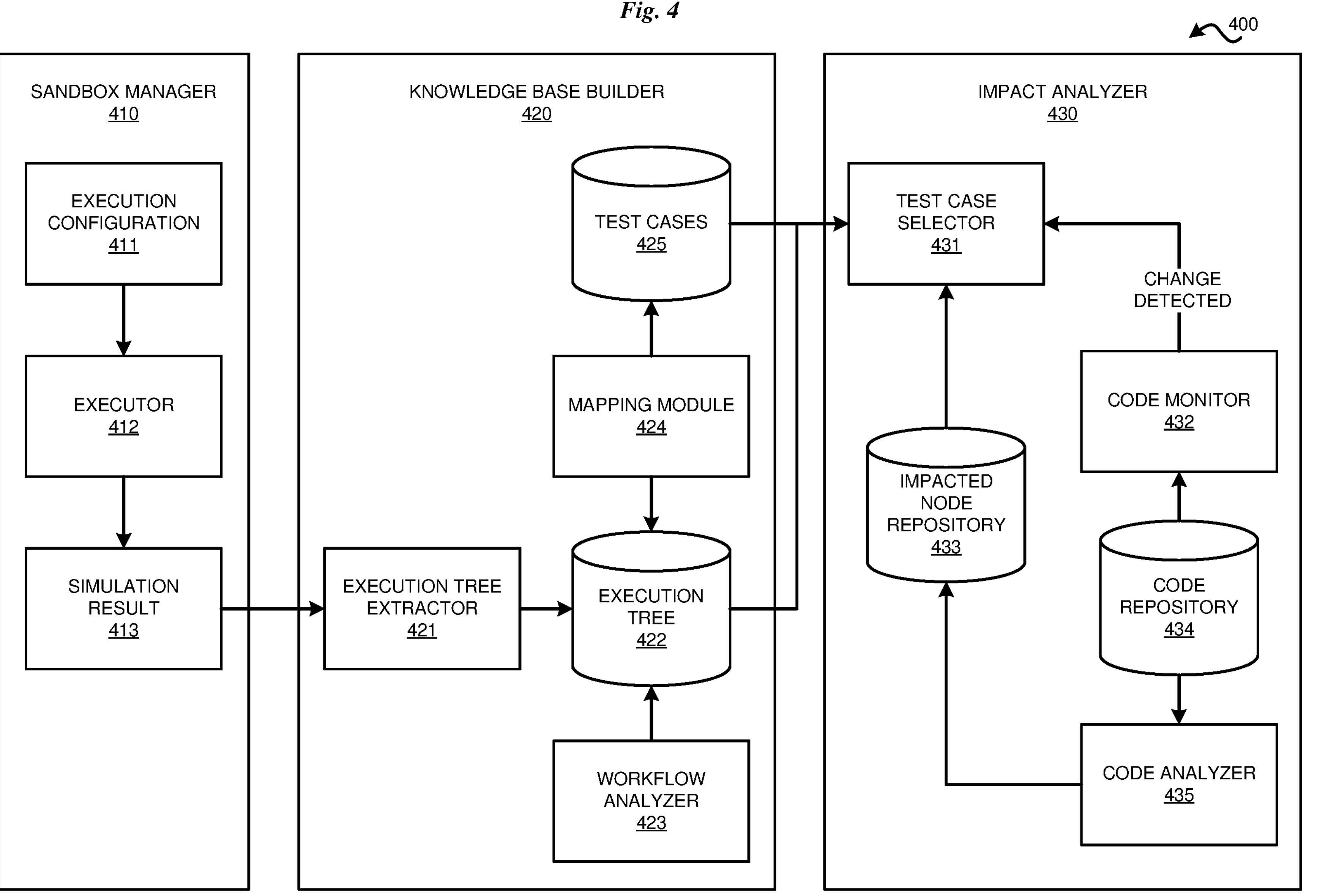
FIG. 4 depicts a block diagram of an example system architecture of a impact analysis module in accordance with an illustrative embodiment.

With reference to FIG. 4, this figure depicts a block diagram of an example system architecture 400 in accordance with an illustrative embodiment. In the illustrated embodiment, impact analyzer module 430 includes aspects of impact analysis module 200 of FIG. 1, and/or impact analyzer module 301 of FIG. 3.

In the illustrated embodiment, the system architecture 400 includes a sandbox manager 410, a knowledge base builder 420, and impact analyzer 430. In an embodiment, the sandbox manager is configured to construct a virtual sandbox execution environment that may be utilized for simulating actions a workflow, such as for example, actions of software application 320 of FIG. 3. In an embodiment, knowledge base builder 420 is configured to construct a knowledge base between execution trees of a workflow (e.g., software application) and test cases corresponding to particular nodes and/or branches of those execution trees. In an embodiment, impact analyzer 430 is configured to monitor changes made to source code of a software application, and select one or more test cases for recommendation and/or execution based on relevance of the test case to the change to source code detected.

In the illustrated embodiment, sandbox manager 410 is configured to construct a sandbox virtual environment for software testing, as described herein. In an embodiment, sandbox manager 410 analyzes an execution configuration 411 of a software application to determine all the actions, roles, dependencies, etc., that may be related to execution of the software application. In an embodiment, executor 412 is a software module configured initiate a simulated execution of the software application, based at least in part on the execution configuration details 411. Accordingly, executor 412 emulates execution of the software application to produce a simulation result 413. Simulation result 413 may contain various execution data related simulation executed by executor 412.

In the illustrated embodiment, knowledge base builder 420 is configured to establish a knowledge base, as described in greater detail herein. In an embodiment, knowledge base builder 420 includes an execution tree extractor 421, which is a software module configured to extract one or more execution trees corresponding to the software application from the simulation result 413. Further, execution tree extractor 421 is configured to store the one or more extracted execution trees on execution tree repository 422.

In the illustrated embodiment, knowledge base builder 420 may include a mapping module 424, such that the mapping module 424 includes a software module configured to establish a mapping between execution trees stored on execution tree repository 422 and test cases stored on test cases repository 425. Accordingly, the mapping established by mapping module 424 may define nodes and/or branches of execution trees as corresponding to particular test cases. Since different test cases may be appropriate for different components of a workflow, the mapping established by mapping module 424 enables execution of test cases for particular components of a software application that may be affected, for example, by a change made to source code of the software application.

In the illustrated embodiment, impact analyzer 430 is configured to perform impact analysis operations, as described in greater detail herein. In an embodiment, impact analyzer 430 includes a code monitor 432, which is a software module configured to monitor any changes made to source code stored on code repository 434. Further, upon detecting a change made to source code stored on code repository 434, code monitor module 432 may send a signal to test case selector 431 to select a set of test cases to recommend and/or execute. In an embodiment, code analyzer 435 is a software module configured to analyze changes made to source code stored on code repository 434, to identify any components of the software application that may be affected by the change made to the source code. In the illustrated embodiment, impacted node repository 433 stores nodes and/or branches of an execution tree corresponding to the software application that may have been affected. In the illustrated embodiment, the test case selector 431 receives a set of impacted nodes/branches, identifies the nodes/branches on the execution tree repository 422, and identifies and retrieves relevant test cases stored on test cases repository 425 based on a comparison of the identified nodes/branches to the execution-tree-to-test-case mapping.

In the illustrated embodiment, impact analyzer module 430 is a software module comprising a plurality of other software modules. In the illustrated embodiment, the impact analyzer module 430 includes a test case selector module 431, a code monitor module 432, and a code analyzer module 435. In the illustrated embodiment, the impact analyzer module further comprises a code repository 434, and an impacted node repository 433. In alternative embodiments, the impact analyzer module 430 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, test case selector module 431 is a software module configured to select one or more sets of test cases to recommend and/or execute upon receiving a notification signal from code monitor module 432 that a code change has been detected. In the illustrated embodiment, impacted node repository 433 is configured to store nodes of an execution tree that may be affected by a change in source code that was detected by code monitor module 432 and subsequently analyzed by code analyzer module 435 which determines what nodes and/or branches of an execution tree may be affected by the change in source code that was detected. In an embodiment, impact analyzer module 430 is configured to establish impacted node repository 433, and store and/or retrieve information from impacted node repository 433.

With reference to FIG. 5, this figure depicts a block diagram of an example impact analyzer module 500. In the illustrated embodiment, impact analyzer module 500 may include aspects of impact analysis module 200 of FIG. 1, impact analyzer module 310 of FIG. 3, and/or impact analyzer module 430 of FIG. 4.

In the illustrated embodiment, the impact analyzer module 500 includes a code monitor module 502, a code analyzer module 504, a simulator module 506, an execution tree module 508, a mapping module 510, a test case selector module 512, a blind spot detector module 514, a cartesian product module 516, a sandbox module 518, and a dependency identifier module 519. In alternative embodiments, the impact analyzer module 430 can include some or all of the functionality described herein but grouped differently into one or more modules. In some embodiments, the functionality described herein is distributed among a plurality of systems, which can include combinations of software and/or hardware-based systems, for example Application-Specific Integrated Circuits (ASICs), computer programs, or smart phone applications.

In the illustrated embodiment, code monitor module 502 is a software module configured to monitor source code stored on a code repository 520 corresponding to a software application. Accordingly, the code monitor module 502 is configured to detect whether any change has been made to any source code stored on code repository 520. In the illustrated embodiment, code analyzer 504 is a software module configured to analyze impact of a change made to source code detected by code monitor 502. In an embodiment, code analyzer 504 identifies components of a software application that may be affected due to the change in source code that was detected.

In the illustrated embodiment, simulator module 506 is a software module configured to simulate actions of a software application, as described in greater detail herein. In the illustrated embodiment, sandbox module 518 is a software module configured to establish a virtual sandbox environment for performing simulating actions of the software application via simulator module 506. In the illustrated embodiment, dependency module 519 is a software module configured to detect dependencies associated with a software application, wherein such dependency details may be utilized by sandbox module 518 to create a virtual sandbox environment to emulate the software application including all of its associated dependencies.

In the illustrated embodiment, execution tree module 508 is a software module configured to extract an execution tree from the results of the simulation performed by simulator module 506. Accordingly, execution data resultant from performance of various simulations of the workflow in the sandbox virtual environment is received by execution tree module 508. In an embodiment, the execution data includes any data resultant from executing the simulation(s) of the workflow in the virtual sandbox environment. In an embodiment, the execution tree includes a plurality of nodes and a plurality of branches between pairs of nodes. In an embodiment, each connection between a pair of nodes via a branch represents a particular execution path of the execution tree. The number of unique execution paths of the execution tree is dependent on the number of nodes as well as the number of branches between each pair of nodes that are connected.

In the illustrated embodiment, mapping module 510 is a software module configured to define a mapping between nodes and/or branches of an execution tree extracted by execution tree module 508 and one or more sets of test cases relevant to particular nodes and/or branches of the execution tree. Although the mapping is described as defining relationships between test cases and nodes, it is contemplated herein that the mapping may likewise define relationships between test cases and branches, execution paths, sub-trees, and/or an execution tree of a workflow.

In the illustrated embodiment, test case selector module 512 is a software module configured to select one or more sets of test cases to recommend and/or execute upon receiving a receiving a notification signal from code monitor module that a code change has been detected. In the illustrated embodiment, impacted node repository 530 is configured to store nodes of an execution tree that may be affected by a change in source code that was detected by code monitor module 502 and subsequently analyzed by code analyzer module 504 which determines what nodes and/or branches of an execution tree may be affected by the change in source code that was detected. In an embodiment, impact analyzer module 5000 is configured to establish impacted node repository 530, and store and/or retrieve information from impacted node repository 530.

Further, in an embodiment, test case selector 512 may be configured to allow a user having sufficient privileges to manually select test cases to execute. In an embodiment, the test case selector 512 may be configured to allow a user having sufficient privileges to execute fewer or additional test cases. For example, there may be a scenario where a tester may know in advance that certain test cases might be unnecessary given the change made to source code.

In the illustrated embodiment, blind spot detector module 514 is a software module configured to detect a blind spot that may arise during workflow testing. In an embodiment, the blind spot detector module 514 identifies nodes and/or branches of one or more execution trees that do not correspond to any test cases or relatively few test cases. In an embodiment, the sufficiency of the cases per node and/or branch may be known to a developer or tester of the workflow.

In the illustrated embodiment, cartesian product module 516 is a software module configured to construct a cartesian product that represents various possible execution paths and scenarios. Accordingly, the cartesian product set of execution trees may be utilized for various purposes, such as for example, to filter an invalid execution tree, find a potential test blind point in the workflow, and build a full knowledge-base for execution trees. In an embodiment, the cartesian product is representative of all possible execution paths corresponding to the workflow.

In the illustrated embodiment, code repository 520 includes a computer storage location configured to store source code corresponding to a software application, as described in greater detail herein. In the illustrated embodiment, execution tree repository 540 includes a computer storage location configured to store one or more execution trees corresponding to a software program, as described in greater detail herein. In the illustrated embodiment, impacted node repository 540 includes a computer storage location configured to store one or more impacted nodes and/or branches of an execution tree corresponding to a software program, as described in greater detail herein. In the illustrated embodiment, impacted node repository 540 includes a computer storage location configured to store one or more test cases that may be recommend to a user and/or automatically executed to determine the functionality of a particular component of a software application of a workflow, as described in greater detail herein.

Figure 6:
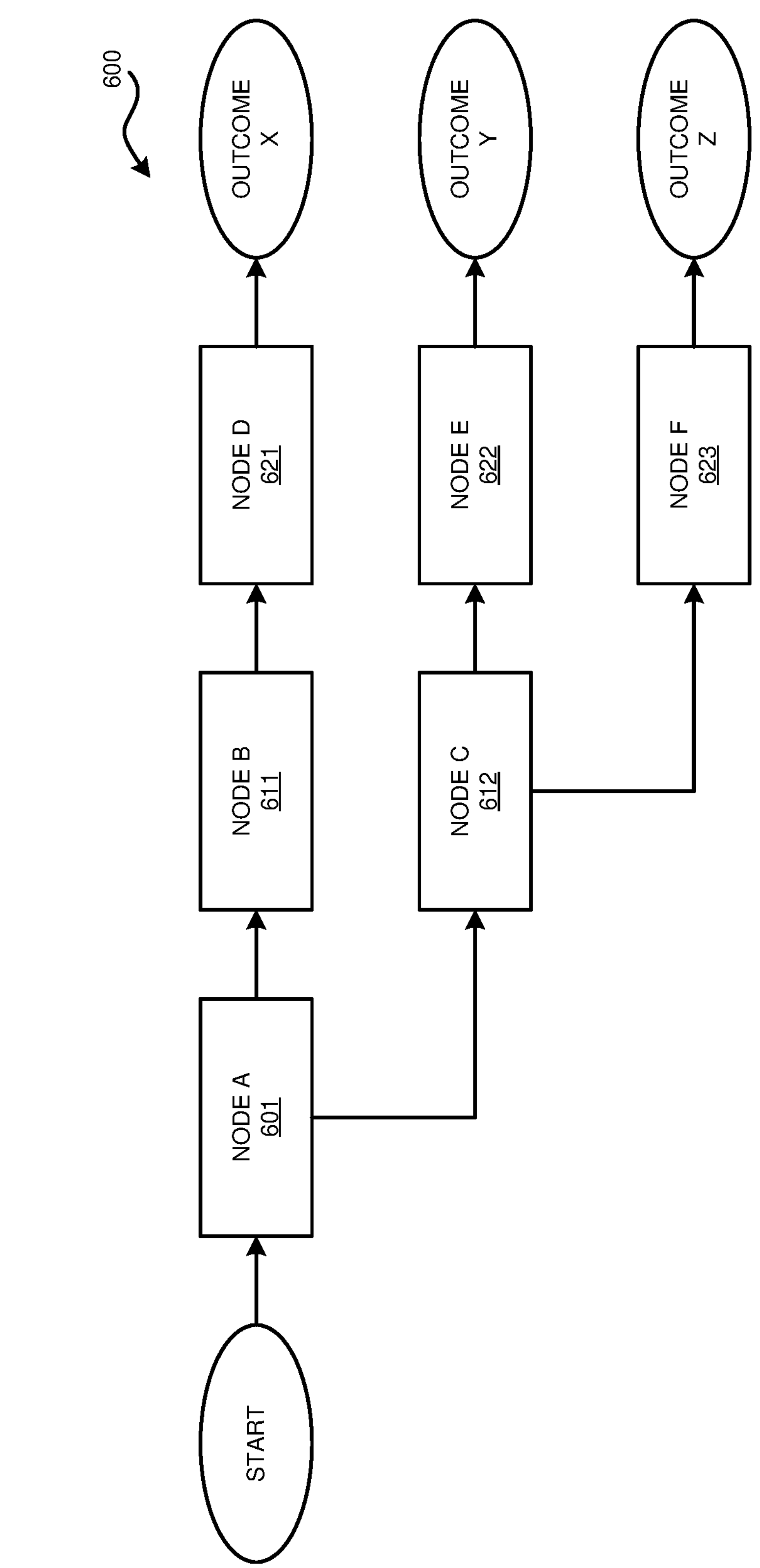
FIG. 6 depicts a block diagram of an example execution tree in accordance with an illustrative embodiment.

With reference to FIG. 6, this figure depicts a block diagram of an example execution tree 600. The execution tree 600 as depicted includes a plurality of nodes, including Node A 601, Node B 611, Node C 612, Node D 621, Node E 622, and Node F 623. Further, each node of the plurality of nodes may correspond to a particular component of a workflow of a software program. Further, the plurality of nodes are connected to each other via pathways or "branches" as depicted through connecting arrows. For example, Node A 601 includes a branch to Node B 611, as well as a branch to Node C 612. Each node represents a particular action or decision taken during execution, such that each action of the execution tree 600 leads to a subsequent action or decision to take, represented by a connected node. Further, decision tree 600 includes a plurality of sub-trees within the structure of decision tree 600. For example, within execution tree 600, a sub-tree of execution tree 600 comprising Nodes C 612, Node E 622, and Node F 623, is shown.

In an embodiment, a process recommends and/or executes a set of software tests based at least in part on components of a software program that may be affected due to detected change in source code of the software program. It is contemplated herein that it may be unnecessary to test every aspect of a software program whenever a change in source code is detected. Instead, in an embodiment of the process disclosed herein, the process only performs software tests to evaluate particular components of the software program that may be affected due to the change in the source code. For example, if a change in source code may have an effect on Node A 601, then the process may execute software tests corresponding to Node A 601, Node B 611, Node C 612, Node D 621, Node E 622, and Node F 623. However, if a change in source can not have any effect on Node A 601, but may have an effect instead on Node C 612, then the process may execute software tests corresponding to Node C 612, Node E 622, and Node F 623. Isolating software tests as described herein may greatly increase the efficiency of software testing, since software tests may be restricted to be executed specifically corresponding to affected nodes of a software program, instead of executed unnecessarily for nodes that can not be affected by a change to source code.

Figure 7:
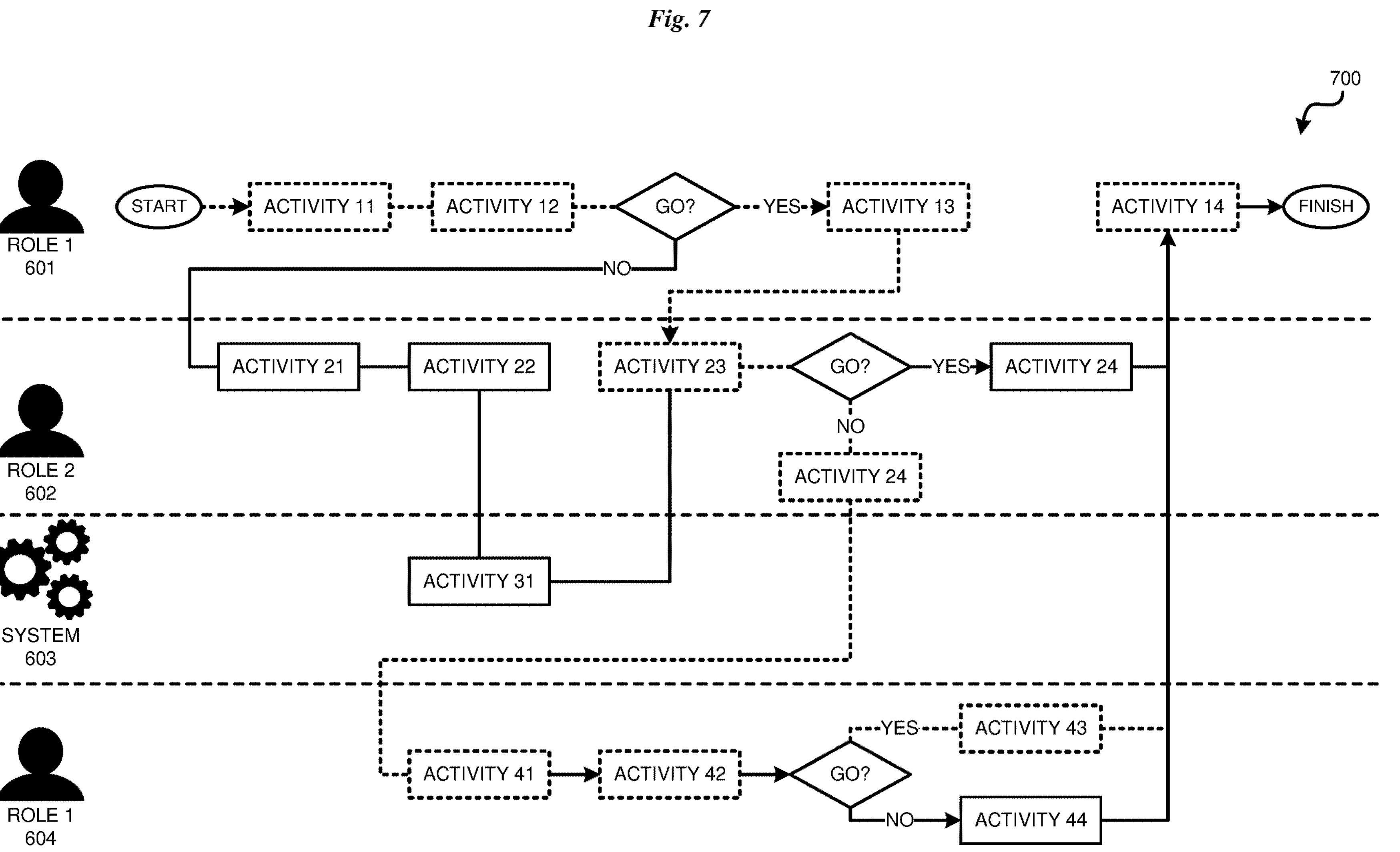
FIG. 7 depicts a block diagram of an example execution in accordance with an illustrative embodiment.

With reference to FIG. 7, this figure depicts an example execution tree 700 of a workflow, in accordance with an illustrative embodiment. In the illustrated embodiment, execution tree 700 includes an execution tree similar in some respect to execution tree 600 of FIG. 6.

In the illustrated embodiment, the execution tree 700 depicts a plurality of roles, including a first role 701, a second role 702, a system role 703, and a third role 704. In the illustrated embodiment, each role of the plurality of roles is responsible for some action or activity, as depicted in the execution tree 700. Further, in the illustrated embodiment, the execution tree 700 includes two primary execution paths that may be followed. Accordingly, the first primary execution path begins after Activity 12 and proceeds to Activity 13, whereas the second primary execution path begins after Activity 12 and proceeds to Activity 23. Depending on the action(s) performed during the process depicted by execution tree 700, one of the two primary paths may be traversed. The depiction of the execution tree 700 is not intended to be limiting, but instead is intended to provide greater clarity regarding how multiple roles may be involved in the execution of particular execution paths of a workflow.

With reference to FIG. 8, this figure depicts a block diagram of an example process for constructing a cartesian product in accordance with an illustrative embodiment. In an embodiment, a process disclose herein constructs a cartesian product that represents various possible execution paths and scenarios. Accordingly, the cartesian product set of execution trees may be utilized for various purposes, such as for example, to filter an invalid execution tree, find a potential test blind point in the workflow, and build a full knowledge-base for execution trees. In an embodiment, the cartesian product is representative of all possible execution paths corresponding to the workflow.

In the illustrated embodiment, the process 800 transforms execution tree 801 into a branch-matrix 802 that defines every branch propagating from each node. For example, in the branch-matrix 802 Node A is shown its branches A1 and A2, which are likewise depicted in the execution tree 801. Further, the process 800 transforms each set of possible execution paths into a cartesian product set 803. For example, two primary execution paths are shown: the first primary execution path traverses Node A, Node B, and Node C, while the second primary execution path traverses Node A and Node D. Further, the process determines every possible execution path that is possible to traverse, which is represented by execution tree matrix 804. Further, the process determines every role involved in every execution path determined, which is represented by execution tree and role matrix 805. As can be appreciated by FIG. 8, the process performs a comprehensive, exhaustive analysis of every possible execution path and scenario that may take place during the execution of a workflow, including every role involved at every step of the workflow.

Figure 9:
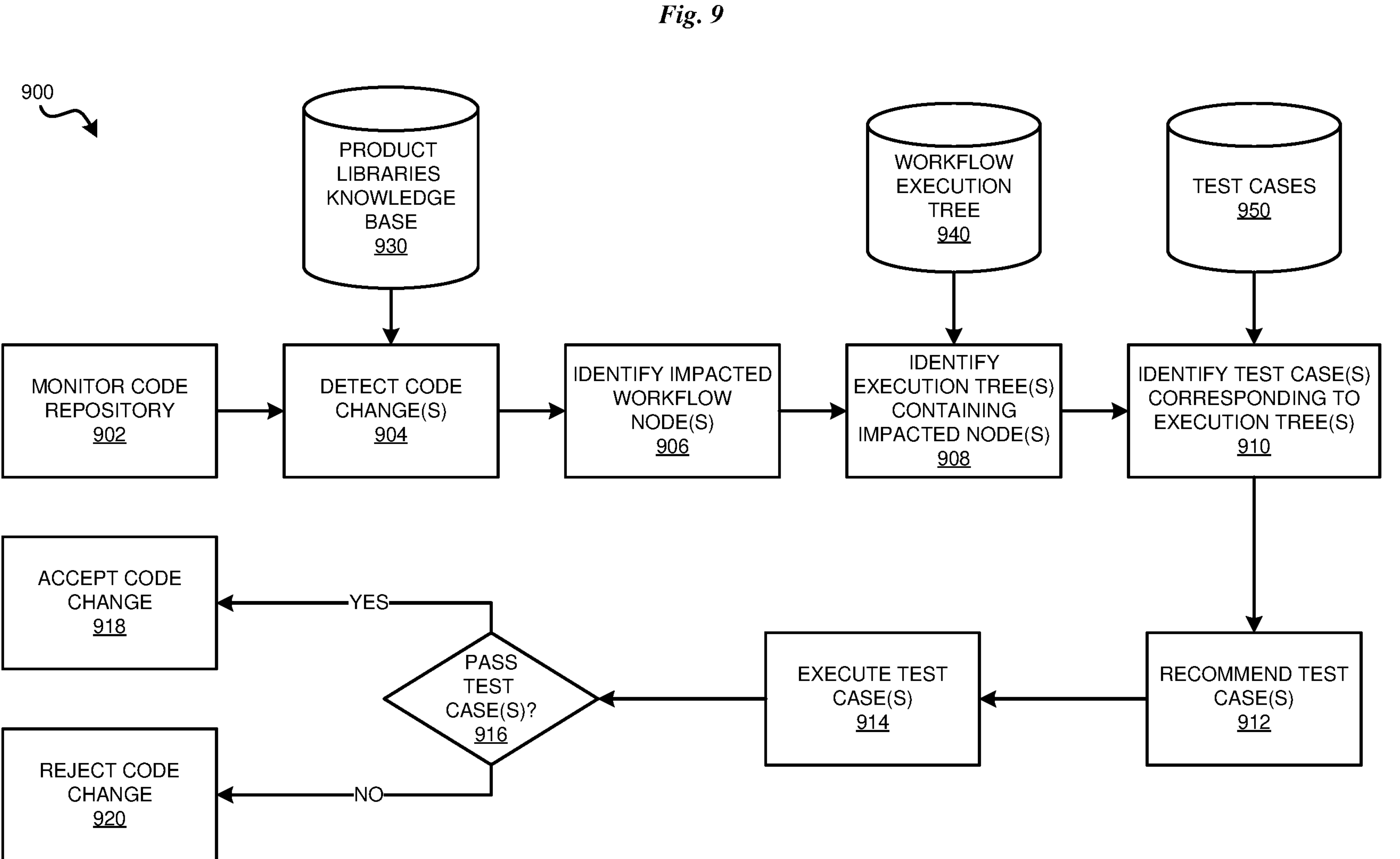
FIG. 9 depicts a block diagram of an example process for impact analysis in accordance with an illustrative embodiment.

With reference to FIG. 9, this figure depicts a block diagram of an example process 900 for performing impact analysis in accordance with an illustrative embodiment. In some particular embodiments, aspects of impact analysis module 200 of FIG. 1, impact analyzer module 310 of FIG. 3, knowledge base builder 420 of FIG. 4, and/or impact analyzer module 500 of FIG. 5 carries out the process 900.

At block 902, the process monitors a code repository for any changes made to source code stored in the code repository. In an embodiment, the code repository stores source code related to a workflow, including source code related to one or more software applications and/or other components involved in the execution of a particular workflow.

At block 904, the process detects a change to source code. In an embodiment, the process detects the change in source code based at least in part on data stored on product libraries knowledge base 930.

At block 906, the process identifies impacted workflow nodes based on the change to source code that was detected. At block 908, the process identifies one or more execution trees corresponding to the impacted workflow nodes identified at block 906. In an embodiment, the process searches workflow execution tree database 940 for an execution tree that contains the impacted workflow node. Accordingly, depending on the impacted workflow node, there may be additional workflow nodes connected to the impacted workflow node that may consequently effected downstream as a result of the change in source code related to the impacted workflow node.

At block 910, the process identifies one or more test cases or sets of test cases corresponding to the execution tree(s) identified at block 908. In an embodiment, the test cases are retrieved from test cases repository 950. In an embodiment, the process compares the identified execution tree(s) to a mapping that defines execution trees with corresponding test cases to determine which test cases should be recommended for execution.

At block 912, the process recommends one or more test cases or sets of test cases for execution. In an embodiment, recommending a test case may include generating a recommendation notification, and transmitting the recommendation notification to a device of an appropriate user, as described in greater detail herein.

At block 914, the process validates whether the one or more test cases have been successfully passed. In an embodiment, if the process determines that all of the test cases have successfully passed, the process continues to block 918 and the detected code change is accepted and integrated into the software application where it was detected. Otherwise, if the process determines that one or more software tests fail, the process continues to block 920 and the code change is rejected causing the software application to revert to a previous state prior to the detection of the change to the source code.

Figure 10:
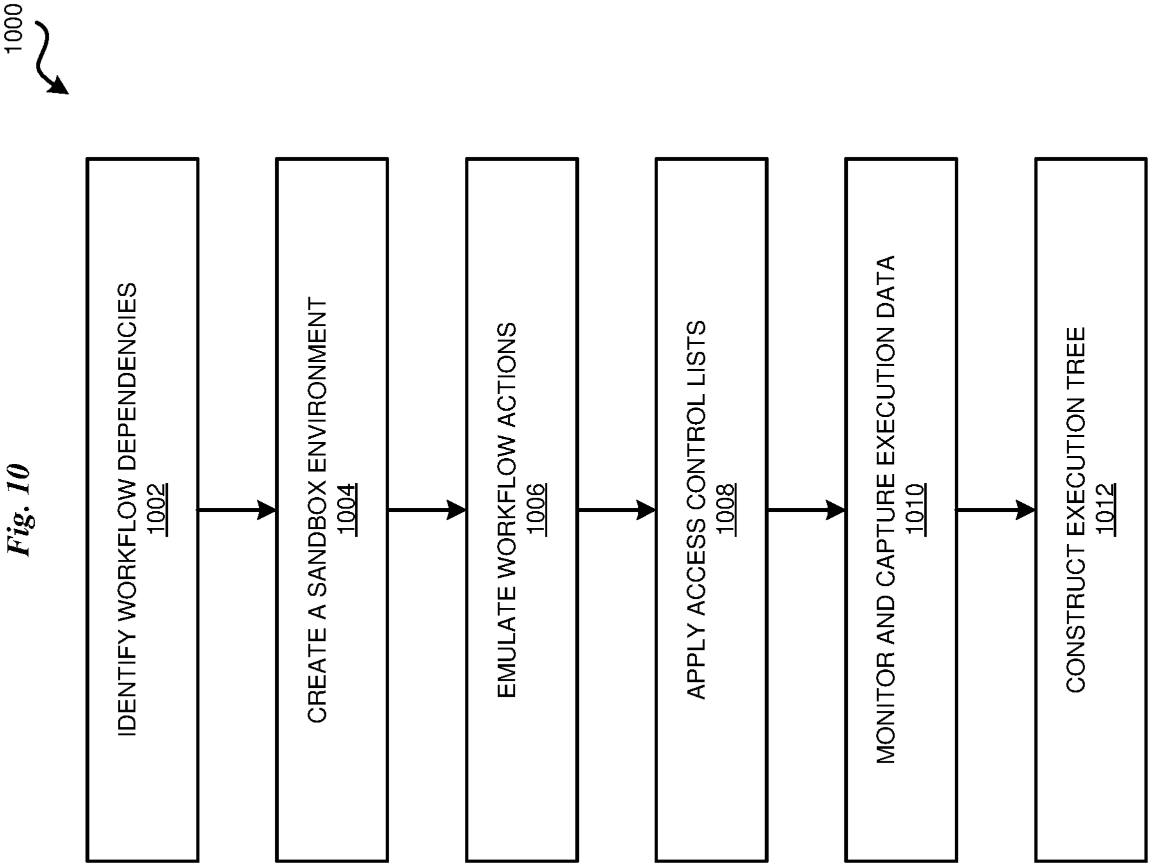
FIG. 10 depicts a flowchart of an example process of constructing of an execution tree in accordance with an illustrative embodiment.

With reference to FIG. 10, this figure depicts a flowchart of an example process 1000 for constructing an execution tree in accordance with an illustrative embodiment. In some particular embodiments, impact analysis module 200 of FIG. 1, impact analyzer module 310 of FIG. 3, knowledge base builder 420 of FIG. 4, and/or impact analyzer module 500 of FIG. 5 carries out the process 1000.

At step 1002, the process analyzes a workflow environment to identify dependencies of the workflow environment. An example dependency of a workflow environment may include, but is not limited to, input data, external systems, and other components that may be accessed and/or utilized during execution of a workflow within the workflow environment. In an embodiment, analyzing the workflow environment further includes analyzing all steps involved in the execution of a workflow in the workflow environment.

At step 1002, the process identifies one or more workflow dependencies of a particular workflow. An example of a workflow dependency may include any pre-requisite task of component necessary for the execution of another task or functioning of any other component in a workflow.

At step 1004, the process creates a sandbox virtual environment representative of an actual workflow. In an embodiment, the process incorporates the one or more dependencies identified at step 1002 in the creation of a sandbox virtual environment. In an embodiment, the process establishes a separate virtual execution environment to emulate the previously analyzed virtual workflow environment. Accordingly, the separate virtual execution environment may be utilized by the process as a sandbox environment for the execution and performance of actions and additional tasks related to the workflow, as described herein. Accordingly, the separate virtual execution environment (or simply "sandbox environment") replicates any necessary dependencies, components, systems, permissions, data, and so forth that may be required for the execution of a workflow.

At step 1006, the process emulates one or more workflow actions of the workflow within the sandbox virtual environment. In an embodiment, the process emulates every possible action within the workflow, to effectively perform an exhaustive simulation of the workflow in the sandbox virtual environment. In an embodiment, the process emulates the execution of the workflow in the sandbox environment by simulating the actions, steps, and interactions, and so forth that occur during operation of the workflow. For example, in an embodiment, emulating the execution of the workflow may include actions that may include, but are not limited to, calling APIs, processing data, performing calculations, interacting with external systems, etc.

At step 1008, the process applies one or more Access Control Lists (ACLs) while simulating different actions in the sandbox virtual environment. Accordingly, an ACL specifies which users or system processes are granted access to resources, as well as what operations are allowed on given resources. It is contemplated that applying different ACLs over the course of performing a number simulations provides different execution scenarios based on each ACL applied. For example, depending on the ACL applied, the existence of certain permissions may allow for the performance of certain actions in the workflow, while the lack of certain permissions may prevent the performance of certain actions, thereby manipulating the execution path(s) of a workflow depending on the permissions available during a particular simulation. In an embodiment, the process incorporates different ACLS into the simulation to account for various permission settings and user roles that may affect the workflow's behavior. It is contemplated that incorporating various ACLs into the simulation may ensure that the simulation covers a multitude of different access scenarios.

At step 1010, the process monitors and captures the execution data resultant from performance of various simulations of the workflow in the sandbox virtual environment. In an embodiment, the execution data includes any data resultant from executing the simulation(s) of the workflow in the virtual sandbox environment. Execution data may include, but is not limited to event logs, outputs, intermediate states, etc. The execution data captured during step 1010 may be utilized for further analysis and/or extraction of an execution tree, as described in greater detail herein.

At step 1012, the process constructs an execution tree. In an embodiment, the process constructs and execution tree based on execution data received from step 1010. In an embodiment, the execution tree includes a plurality of nodes and a plurality of branches between pairs of nodes. In an embodiment, each connection between a pair of nodes via a branch represents a particular execution path of the execution tree. The number of unique execution paths of the execution tree is dependent on the number of nodes as well as the number of branches between each pair of nodes that are connected.

Figure 11:
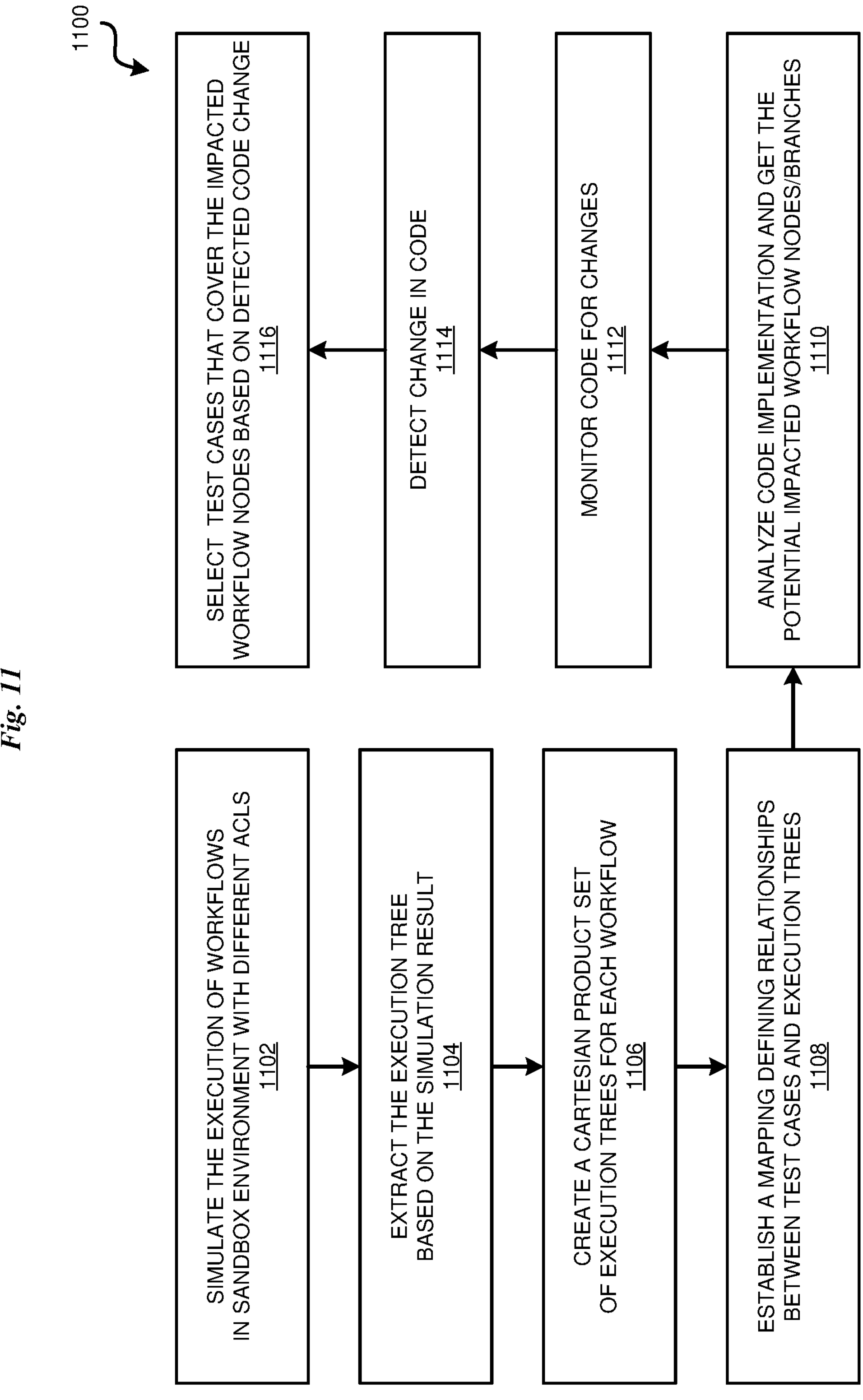
FIG. 11 depicts a flowchart of an example process for impact analysis in accordance with an illustrative embodiment.

With reference to FIG. 11, this figure depicts a flowchart of an example process 1000 for impact analysis in accordance with an illustrative embodiment. In some particular embodiments, impact analysis module 200 of FIG. 1, impact analyzer module 310 of FIG. 3, and/or impact analyzer module 500 of FIG. 5 carries out the process 1100.

At step 1102, the process executes simulations of workflows in a sandbox environment using various Access Control Lists (ACLs). In some embodiments, step 1102 of process 1100 includes steps from process 1000 of FIG. 10, such as for example, step 1006 and/or step 1008. In an embodiment, the process receives various execution data resultant executing the simulations of workflows with different ACLs applied per simulation.

At step 1104, the process extracts an execution tree based on the execution data received from performing simulations of the workflow in the virtual sandbox environment. In some embodiments, step 1104 includes steps from process 1000 of FIG. 10, such as for example, step 1002 for constructing an execution tree based at least in part on execution data.

At step 1106, the process constructs a cartesian product set of execution trees for a particular workflow. In an embodiment, the cartesian product set represents various possible execution paths and scenarios. In an embodiment, the cartesian product is representative of all possible execution paths corresponding to the workflow.

At step 1108, the process establishes a mapping that defines relationships between test cases and execution trees. In an embodiment, the mapping defines one or more particular test cases or sets of tests for each node, branch, and/or execution path of an execution tree.

For example, suppose a scenario in which a particular workflow may include Node A, Node B, Node C, and Node D, such that Node A is connected to Node B via a first branch and Node A is connected to Node C via a second branch. Further, continuing on the example scenario, suppose Node D is connected to Node C via a third branch. In such a scenario, the workflow includes an execution tree that contains Nodes A, B, C, and D, a sub-tree that contains Nodes A, and B, a sub-tree that contains Nodes A, C, and D, and another sub-tree that contains nodes C and D. Each of Nodes A, B, C, and D may be associated with particular test cases that may be executed to determine the behavior, performance, and/or functionality of the particular node, as well as the workflow as a whole. Although the mapping is described as defining relationships between test cases and nodes, it is contemplated herein that the mapping may likewise define relationships between test cases and branches, execution paths, sub-trees, and/or an execution tree of a workflow.

At step 1110, the process analyzes a code implementation of workflow and identifies nodes and/or branches of an execution tree that may be potentially impacted depending on a change made to the code implementation. For example, continuing on the previous example scenario depicted above, if a change is made that may impact Node A, that change has the potential to also impact Node B, Node C, and Node D. Further, if a change is made that may impact Node B, that change might only have the potential to impact Node B. And if a change is made that may impact Node C, that change might also have the potential to impact Node D. Thus, the particular change to the code implementation of a particular workflow may create potential downstream consequences depending on the particular node/branch the change has a primary effect on.

At step 1112, the process monitors code for any changes. In an embodiment, the process monitors a source code repository storing source code of a software application or applications corresponding to a particular workflow. In some such embodiments, the process monitors whether any change is made any source code stored on the source code repository.

At step 1114, the process detects a change to source code while monitoring the source code for any changes. At step 1116, upon detection of a change to source code, the process selects one or more test cases or sets of test cases to execute depending on the potentially impacted nodes and/or branches of the execution tree representing the workflow. In an embodiment, the process selects the one or more test cases or sets of test cases to execute via the mapping, by comparing the potentially impacted nodes/branches to the mapping, to identify which test cases to execute based on the potentially impacted nodes/branches identified.

Figure 12:
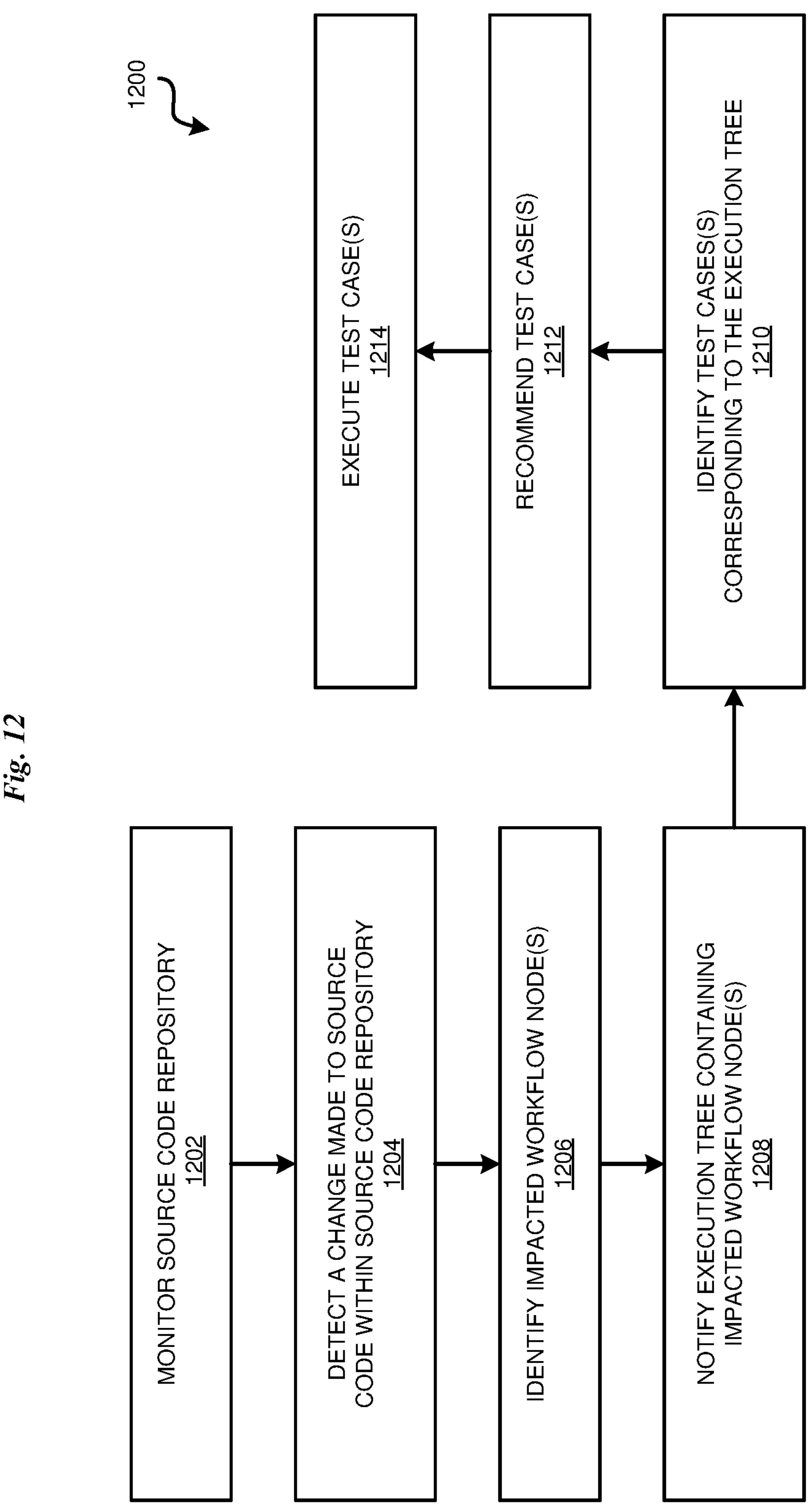
FIG. 12 depicts a flowchart of an example process for impact analysis in accordance with an illustrative embodiment.

With reference to FIG. 12, this figure depicts a flowchart of an example process 1200 for performing impact analysis in accordance with an illustrative embodiment. In some particular embodiments, impact analysis module 200 of FIG. 1, impact analyzer module 310 of FIG. 3, impact analyzer module 430 of FIG. 4, and/or impact analyzer module 500 of FIG. 5 carries out the process 1200.

At step 1202, the process monitors a source code repository. At step 1204, the process detects a change made to a source code stored on the source code repository. At step 1206, the process identifies an impacted workflow node based on the change to the source code that was detected. At step 1208, the process identifies one or more execution trees that contain the identified impacted workflow node(s). At step 1210, the process identifies one or more test cases corresponding to the execution tree identified. At step 1212, the process generates and transmits a recommendation to execute the one or more test cases identified. At step 1214, the process executes the one or more test cases.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms “about,” “substantially,” “approximately,” and variations thereof, are intended to include the degree of error associated with measurement of the particular quantity based upon the equipment available at the time of filing the application. For example, “about” can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure.

In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client’s operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

simulating a workflow in a sandbox virtual environment to generate execution data and extracting a plurality of execution trees from the execution data, the simulating comprising applying a plurality of access control lists (ACLs) to the workflow to generate different execution paths of the workflow;

establishing a mapping that defines relationships between the plurality of execution trees and a plurality of sets of corresponding test cases;

detecting one or more blind spots by identifying a node of one or more of the plurality of execution trees that corresponds to an insufficient number of test cases;

monitoring a code repository for changes made to source code;

detecting a change made to the source code;

upon detecting the change made to the source code, identifying a potentially impacted workflow node of a workflow based on the change made to the source code;

identifying an execution tree of the workflow that contains the potentially impacted workflow node;

identifying a set of test cases corresponding to the execution tree;

generating a test case recommendation based on the set of test cases identified;

transmitting the test case recommendation to a user device; and automatically executing the set of test cases identified.

2. The computer-implemented method of claim 1, wherein the computer-implemented method further comprises:

determining whether the set of test cases validates desired functioning of the workflow, and, upon a determination that the set of test cases validates desired functioning of the workflow, implementing the change made to the source code to the code repository.

3. The computer-implemented method of claim 1, wherein the computer-implemented method further comprises identifying at least one dependency of the workflow, and incorporating the at least one dependency in the sandbox virtual environment.

4. The computer-implemented method of claim 1, wherein the computer-implemented method further comprises constructing a cartesian product set defining all possible execution paths of the workflow.

5. The computer-implemented method of claim 1, wherein the computer-implemented method further comprises detecting a blind spot in an execution path of the workflow.

6. A computer program product for impact analysis comprising one or more computer readable storage media, and program instructions collectively stored on the one or more computer readable storage media, the program instructions executable by a processor to cause the processor to perform operations comprising:

simulating a workflow in a sandbox virtual environment to generate execution data and extracting a plurality of execution trees from the execution data, the simulating comprising applying a plurality of access control lists (ACLs) to the workflow to generate different execution paths of the workflow;

establishing a mapping that defines relationships between the plurality of execution trees and a plurality of sets of corresponding test cases;

detecting one or more blind spots by identifying a node of one or more of the plurality of execution trees that corresponds to an insufficient number of test cases;

monitoring a code repository for changes made to source code;

detecting a change made to the source code;

upon detecting the change made to the source code, identifying a potentially impacted workflow node of a workflow based on the change made to the source code;

identifying an execution tree of the workflow that contains the potentially impacted workflow node;

identifying a set of test cases corresponding to the execution tree;

generating a test case recommendation based on the set of test cases identified;

transmitting the test case recommendation to a user device; and automatically executing the set of test cases identified.

7. The computer program product of claim 6, wherein the program instructions are stored in a computer readable storage device in a data processing system, and wherein the program instructions are transferred over a network from a remote data processing system.

8. The computer program product of claim 6, wherein the program instructions are stored in a computer readable storage device in a server data processing system, and wherein the program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

9. The computer program product of claim 6, wherein the program instructions further comprise program instructions to identify at least one dependency of the workflow, and incorporate the at least one dependency into the sandbox virtual environment.

10. The computer program product of claim 6, wherein the program instructions further comprise program instructions to construct a cartesian product set defining all possible execution paths of the workflow.

11. The computer program product of claim 6, wherein the program instructions further comprise program instructions to detect a blind spot in an execution path of the workflow.

12. A computer system comprising a processor and one or more computer readable storage media, and program instructions collectively stored on the one or more computer readable storage media, the program instructions executable by the processor to cause the processor to perform operations comprising:

simulating a workflow in a sandbox virtual environment to generate execution data and extracting a plurality of execution trees from the execution data, the simulating comprising applying a plurality of access control lists (ACLs) to the workflow to generate different execution paths of the workflow;

establishing a mapping that defines relationships between the plurality of execution trees and a plurality of sets of corresponding test cases;

detecting one or more blind spots by identifying a node of one or more of the plurality of execution trees that corresponds to an insufficient number of test cases;

monitoring a code repository for changes made to source code;

detecting a change made to the source code;

upon detecting the change made to the source code, identifying a potentially impacted workflow node of a workflow based on the change made to the source code;

identifying an execution tree of the workflow that contains the potentially impacted workflow node;

identifying a set of test cases corresponding to the execution tree;

generating a test case recommendation based on the set of test cases identified;

transmitting the test case recommendation to a user device; and automatically executing the set of test cases identified.

13. The computer system of claim 12, further comprising identifying at least one dependency of the workflow, and incorporating the at least one dependency in the sandbox virtual environment.

* * * * *